(12) United States Patent
Lin et al.

(10) Patent No.: US 11,140,704 B2
(45) Date of Patent: Oct. 5, 2021

(54) METHOD, APPARATUS AND SYSTEM FOR UPLINK INFORMATION TRANSMISSION

(71) Applicant: GUANGDONG OPPO MOBILE TELECOMMUNICATIONS CORP., LTD., Guangdong (CN)

(72) Inventors: Ya'nan Lin, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 153 days.

(21) Appl. No.: 16/356,271

(22) Filed: Mar. 18, 2019

(65) Prior Publication Data

US 2019/0215857 A1   Jul. 11, 2019

Related U.S. Application Data

(63) Continuation of application No. PCT/CN2017/088472, filed on Jun. 15, 2017.

(51) Int. Cl.
*H04W 72/12* (2009.01)
*H04L 5/14* (2006.01)
(Continued)

(52) U.S. Cl.
CPC ....... *H04W 72/1284* (2013.01); *H04L 5/0055* (2013.01); *H04L 5/0057* (2013.01);
(Continued)

(58) Field of Classification Search
None
See application file for complete search history.

(56) References Cited

U.S. PATENT DOCUMENTS

2016/0036577 A1   2/2016   Meng
2017/0347271 A1*  11/2017  Baldemair ............ H04W 16/14
(Continued)

FOREIGN PATENT DOCUMENTS

CN   103561475 A   2/2014
CN   104468182 A   3/2015
(Continued)

OTHER PUBLICATIONS

The second Office Action of corresponding European application No. 17913648.6, dated Apr. 30, 2020.
(Continued)

*Primary Examiner* — Phirin Sam
*Assistant Examiner* — Sori A Aga

(57) ABSTRACT

Embodiments of the present disclosure provide a method, apparatus and a system for uplink information transmission relating to the field of communications. The method includes: transmitting, by a first access network device, first configuration information to a second access network device, where the first configuration information is used to indicate a resource in a target carrier, and the second access network device is configured to receive, in the resource, second uplink information transmitted by a terminal device; transmitting on a first carrier, by the first access network device, first downlink information to the terminal device based on a first communication protocol; receiving on the target carrier, by the first access network device, first uplink information transmitted by the terminal device.

17 Claims, 14 Drawing Sheets

(51) Int. Cl.
  *H04L 5/00* (2006.01)
  *H04W 72/00* (2009.01)
  *H04W 76/15* (2018.01)
  *H04W 36/00* (2009.01)
  *H04W 76/10* (2018.01)

(52) U.S. Cl.
  CPC .............. *H04L 5/14* (2013.01); *H04W 72/00* (2013.01); *H04W 76/15* (2018.02); *H04W 36/0069* (2018.08); *H04W 76/10* (2018.02)

(56) References Cited

U.S. PATENT DOCUMENTS

| | | | | |
|---|---|---|---|---|
| 2018/0192404 | A1* | 7/2018 | Maaref | H04L 5/0048 |
| 2018/0227960 | A1* | 8/2018 | Belghoul | H04L 1/1854 |
| 2019/0089498 | A1* | 3/2019 | Pelletier | H04L 5/0053 |
| 2020/0196302 | A1* | 6/2020 | Takeda | H04W 72/04 |

FOREIGN PATENT DOCUMENTS

| | | |
|---|---|---|
| CN | 105898872 A | 8/2016 |
| CN | 106255207 A | 12/2016 |
| CN | 106507495 A | 3/2017 |
| WO | 2015020394 A1 | 2/2015 |

OTHER PUBLICATIONS

The First Office Action of corresponding Chinese application No. 201780052338.3, dated Jun. 3, 2020.
The EESR of corresponding European application No. 17913648.6, dated Sep. 4, 2019.
First Taiwan Office Action dated Jun. 28, 2019; 107118393.
The International Search Report dated Oct. 30, 2017; PCT/CN2017/088472.
Huawei et al: "Overview of NR UL for LTE-NR coexistence", 3GPP Draft; R1-1709383, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15-19, 2017 May 17, 2017 (May 17, 2017), XP051285096.
Qualcomm Incorporated: "NR-LTE Co-channel Coexistence Consideration", 3GPP Draft; R1-1708655 NR-LTE Co-Channel Coexistence Consideration,, 3rd Generation Partnership Project (3GPP), Mobile Competence Centre; 650, Route Des Lucioles; F-06921 Sophia-Antipolis Cedex; FRA, vol. 1 Ran WG1, No. Hangzhou, China; May 15-19, 2017 May 14, 2017(May 14, 2017), XP051273842.
The European First Examination Report of corresponding European application No. 17913648.6, dated Jan. 24, 2020.
The third Office Action of corresponding European application No. 17913648.6, dated Oct. 8, 2020.
The fourth Office Action of corresponding European application No. 17913648.6, dated Jan. 20, 2021.

* cited by examiner ing accuracy of a downlink receiver corresponding to the LTE carrier or of a downlink receiver corresponding to the NR carrier. Therefore, there is no solution at present with regard to how to implement the dual connectivity operation for the terminal device without interference between the LTE carrier and the NR carrier.
METHOD, APPARATUS AND SYSTEM FOR UPLINK INFORMATION TRANSMISSION

CROSS-REFERENCE TO RELATED APPLICATIONS

This application is a continuation application of the International application PCT/CN2017/088472, filed on Jun. 15, 2017, entitled "METHOD, APPARATUS AND SYSTEM FOR UPLINK INFORMATION TRANSMISSION", the content of which is hereby incorporated by reference in its entirety.

TECHNICAL FIELD

Embodiments of the present disclosure relate to the field of communications and, in particular, to a method, apparatus, and a system for uplink information transmission.

BACKGROUND

Uplink information includes uplink control information (UCI) and uplink service data that are transmitted by a terminal device to an access network device. With the evolution of technologies and the increase of data services, in a 5th generation mobile communication (5G) system, there is a scenario where a terminal device is configured to operate under multiple access network devices (i.e., Dual Connectivity).

In the related art, an example of configuring a first access network device and a second access network device for a terminal device is taken in the Dual Connectivity operation scenario, where the first access network device is an access network device based on the long term evolution (LTE) protocol and the second access network device is an access network device based on the NR (New Radio) protocol. When the terminal device receives first downlink information that is transmitted by the first access network device over an LTE carrier, the terminal device generates first uplink information corresponding to the LTE carrier. When the terminal device receives second downlink information that is transmitted by the second access network device over an NR carrier, the terminal device generates second uplink information corresponding to the NR carrier. When the first uplink information and the second uplink information need to be transmitted simultaneously, the terminal device transmits the first uplink information to the first access network device on the LTE carrier, and transmits the second uplink information to the second access network device on the NR carrier.

However, since the LTE carrier and the NR carrier will generate harmonics or intermodulation interference during simultaneous transmission, the terminal device's transmission of both the first uplink information and the second uplink information in the above method will reduce receiving accuracy of a downlink receiver corresponding to the LTE carrier or of a downlink receiver corresponding to the NR carrier. Therefore, there is no solution at present with regard to how to implement the dual connectivity operation for the terminal device without interference between the LTE carrier and the NR carrier.

SUMMARY

In order to solve the problem in the related art with regard to how to implement the dual connectivity operation for the terminal device without interference between the LTE carrier and the NR carrier, embodiments of the present disclosure provide a method, apparatus, and a system for uplink information transmission. The described technical solutions are as follows.

According to a first aspect of embodiments of the present disclosure, a method for uplink information transmission is provided, including:

transmitting, by a first access network device, first configuration information to a second access network device, where the first configuration information is used to indicate a resource in a target carrier, and the second access network device is configured to receive, in the resource, second uplink information transmitted by a terminal device;

transmitting on a first carrier, by the first access network device, first downlink information to the terminal device based on a first communication protocol; and receiving on the target carrier, by the first access network device, first uplink information transmitted by the terminal device;

where the second access network device is further configured to transmit, on a second carrier, second downlink information to the terminal device based on a second communication protocol, and the first communication protocol is different from the second communication protocol.

In an optional implementation, when the first carrier is a time division duplexing (TDD) carrier, the target carrier is a carrier as same as the first carrier;

or, when the first carrier is a frequency division duplexing (FDD) downlink carrier, the target carrier is an uplink carrier paired with the first carrier.

In an optional implementation, the receiving on the target carrier, by the first access network device, the first uplink information transmitted by the terminal device includes:

receiving over a first uplink channel on the target carrier, by the first access network device, the first uplink information transmitted by the terminal device, where the first uplink channel is different from a second uplink channel which is a channel over which the second access network device receives, in the resource, the second uplink information transmitted by the terminal device.

In an optional implementation, the first uplink channel is an uplink channel based on the first communication protocol.

In an optional implementation, the first access network device transmits third configuration information to the terminal device, where the third configuration information is used to indicate a transmission parameter of the second uplink information.

In an optional implementation, the first communication protocol includes an LTE protocol, and the second communication protocol includes an NR protocol.

According to a second aspect of embodiments of the present disclosure, a method for uplink information transmission is provided, including:

transmitting on a second carrier, by a second access network device, second downlink information to a terminal device based on a second communication protocol; and receiving on a target carrier, by the second access network device, second uplink information transmitted by the terminal device;

where the terminal device is configured to transmit, on the target carrier, first uplink information to a first access network device based on a first communication protocol which is different from the second communication protocol.

In an optional implementation, the second access network device receives first configuration information transmitted by the first access network device, where the first configuration information is used to indicate a resource in the target carrier;

the receiving on the target carrier, by the second access network device, the second uplink information transmitted by the terminal device includes:

receiving in the resource, by the second access network device, the second uplink information transmitted by the terminal device.

In an optional implementation, the second uplink information includes at least one of:

feedback information corresponding to the second downlink information: acknowledgement (ACK) or non-acknowledgement (NACK);

a channel quality indicator (CQI) of the second carrier.

In an optional implementation, the second access network device transmits fourth configuration information to the terminal device, where the fourth configuration information is used to indicate a transmission parameter of the second uplink information.

In an optional implementation, the receiving on the target carrier, by the second access network device, the second uplink information transmitted by the terminal device includes:

receiving over a second uplink channel on the target carrier, by the second access network device, the second uplink information transmitted by the terminal device, where the second uplink channel is different from a first uplink channel which is a channel over which the first access network device receives on the target carrier the first uplink information transmitted by the terminal device.

In an optional implementation, the second uplink channel is an uplink channel based on the first communication protocol or the second communication protocol.

In an optional implementation, the first communication protocol includes an LTE protocol, and the second communication protocol includes an NR protocol.

According to a third aspect of embodiments of the present disclosure, a method for uplink information transmission is provided, including:

receiving on a first carrier based on a first communication protocol, by a terminal device, first downlink information transmitted by a first access network device;

receiving on a second carrier based on a second communication protocol, by the terminal device, second downlink information transmitted by a second access network device; and transmitting on a target carrier, by the terminal device, first uplink information to the first access network device based on the first communication protocol and second uplink information to the second access network device;

where the first communication protocol is different from the second communication protocol.

In an optional implementation, when the first carrier is a TDD carrier, the target carrier is a carrier as same as the first carrier; or when the first carrier is a FDD downlink carrier, the target carrier is an uplink carrier paired with the first carrier.

In an optional implementation, the first uplink information includes at least one of:

feedback acknowledge information (ACK/NACK) corresponding to the first downlink information;

a CQI of the first carrier;

a Scheduling Request (SR); and uplink traffic data.

In an optional implementation, the second uplink information includes at least one of:

feedback acknowledge information (ACK/NACK) corresponding to the second downlink information; and a CQI of the second carrier.

In an optional implementation, the method further includes:

receiving, by the terminal device, second configuration information transmitted by the first access network device, where the second configuration information is used to indicate a transmission parameter of the first uplink information.

In an optional implementation, the transmission parameter of the first uplink information includes first channel resource indication information which is used to indicate a time-domain resource location and/or a frequency-domain resource location of a physical channel that is configured to transmit on the target carrier the first uplink information.

In an optional implementation, the method further includes:

receiving, by the terminal device, third configuration information transmitted by the first access network device, where the third configuration information is used to indicate a transmission parameter of the second uplink information; or receiving, by the terminal device, fourth configuration information transmitted by the second access network device, where the fourth configuration information is used to indicate a transmission parameter of the second uplink information; or receiving, by the terminal device, fifth configuration information transmitted by the first access network device and sixth configuration information transmitted by the second access network device, and determining a transmission parameter of the second uplink information according to the fifth configuration information and the sixth configuration information.

In an optional implementation, the fifth configuration information is used to indicate a first time-frequency resource, and the sixth configuration information is used to indicate a second time-frequency resource which is a subset of the first time-frequency resource.

In an optional implementation, the transmission parameter of the second uplink information includes second channel resource indication information which is used to indicate a time-domain resource location and/or a frequency-domain resource location of a physical channel that is configured to transmit on the target carrier the second uplink information.

In an optional implementation, the transmitting on the target carrier, by the terminal device, the first uplink information to the first access network device based on the first communication protocol and the second uplink information to the second access network device includes:

transmitting on the target carrier, by the terminal device, the first uplink information using a first uplink channel and the second uplink information using a second uplink channel;

where the first uplink channel is different from the second uplink channel.

In an optional implementation, the first uplink channel is an uplink channel based on the first communication protocol.

In an optional implementation, the second uplink channel is an uplink channel based on the first communication protocol or the second communication protocol.

In an optional implementation, the second uplink channel is a physical uplink control channel (PUCCH).

In an optional implementation, the first communication protocol includes an LTE protocol, and the second communication protocol includes an NR protocol.

According to a fourth aspect of embodiments of the present disclosure, apparatus for uplink information transmission is provided, including: at least one module for implementing the method for the uplink information transmission provided in the first aspect described above or in any one of the optional implementations of the first aspect.

According to a fifth aspect of embodiments of the present disclosure, apparatus for uplink information transmission is provided, including: at least one module for implementing the method for the uplink information transmission provided in the second aspect described above or in any one of the optional implementations of the second aspect.

According to a sixth aspect of embodiments of the present disclosure, apparatus for uplink information transmission is provided, including: at least one module for implementing the method for the uplink information transmission provided in the third aspect described above or in any one of the optional implementations of the third aspect.

According to a seventh aspect of embodiments of the present disclosure, an access network device is provided, including: a processor, a memory, a transmitter, and a receiver;

where the memory is configured to store one or more instructions that are indicated as executable by the processor;

the processor is configured to implement the method for the uplink information transmission provided in the first aspect described above or in any one of the optional implementations of the first aspect.

According to an eighth aspect of embodiments of the present disclosure, an access network device is provided, including: a processor, a memory, a transmitter, and a receiver;

where the memory is configured to store one or more instructions that are indicated as executable by the processor;

the processor is configured to implement the method for the uplink information transmission provided in the second aspect described above or in any one of the optional implementations of the second aspect.

According to a ninth aspect of embodiments of the present disclosure, a terminal device is provided, including: a processor, a memory, a transmitter, and a receiver;

where the memory is configured to store one or more instructions that are indicated as executable by the processor;

the processor is configured to implement the method for the uplink information transmission provided in the third aspect described above or in any one of the optional implementations of the third aspect.

According to a tenth aspect of embodiments of the present disclosure, a computer readable medium is provided, where the computer readable medium is stored with one or more instructions that are loadable and executable by a processor to implement the method for the uplink information transmission provided in the first aspect described above or in any one of the optional implementations of the first aspect.

According to an eleventh aspect of embodiments of the present disclosure, a computer readable medium is provided, where the computer readable medium is stored with one or more instructions that are loadable and executable by a processor to implement the method for the uplink information transmission provided in the second aspect described above or in any one of the optional implementations of the second aspect.

According to a twelfth aspect of embodiments of the present disclosure, a computer readable medium is provided, where the computer readable medium is stored with one or more instructions that are loadable and executable by a processor to implement the method for the uplink information transmission provided in the third aspect described above or in any one of the optional implementations of the third aspect.

According to a thirteenth aspect of embodiments of the present disclosure, a system for uplink information transmission is provided, including: a first access network device, a second access network device, and a terminal device, where the first access network device includes the apparatus for the uplink information transmission provided in the fourth aspect described above or in any one of the optional implementations of the fourth aspect, the second access network device includes the apparatus for the uplink information transmission provided in the fifth aspect described above or in any one of the optional implementations of the fifth aspect, and the terminal device includes the apparatus for the uplink information transmission provided in the sixth aspect described above or in any one of the optional implementations of the sixth aspect.

According to a fourteenth aspect of embodiments of the present disclosure, a system for uplink information transmission is provided, including: a first access network device, a second access network device, and a terminal device, where the first access network device includes the access network device provided in the seventh aspect described above or in any one of the optional implementations of the seventh aspect, the second access network device includes the access network device provided in the eighth aspect described above or in any one of the optional implementations of the eighth aspect, and the terminal device includes the terminal device provided in the ninth aspect described above or in any one of the optional implementations of the ninth aspect.

The technical solutions provided in the embodiments of the present disclosure have the following beneficial effects:

After receiving, on a first carrier based on a first communication protocol, first downlink information transmitted by a first access network device and receiving, on a second carrier based on a second communication protocol, second downlink information transmitted by a second access network device, a terminal device transmits, on a target carrier, first uplink information to the first access network device based on the first communication protocol and second uplink information to the second access network device such that the terminal device receives, in a dual connectivity operation scenario, the first downlink information and the second downlink information respectively on the two carriers; when there is a need to simultaneously transmit first uplink information corresponding to the first downlink information and second uplink information corresponding to the second downlink information, the terminal device can simultaneously transmit the first uplink information and the second uplink information over one uplink carrier, i.e. the target carrier, thereby avoiding harmonics or intermodulation interference due to simultaneous transmission of two carriers, such as an LTE carrier and an NR carrier, and implementing normal and timely uplink information transmission under the premise of reduction of terminal costs.

BRIEF DESCRIPTION OF DRAWINGS

To illustrate the technical solutions in the embodiments of the present disclosure more clearly, the drawings used for describing the embodiments will be briefly introduced below. Obviously, the accompanying drawings described below only show some embodiments of the present disclosure. For persons of ordinary skill in the art, other drawings may also be derived from these accompanying drawings without any creative effort.

DESCRIPTION OF EMBODIMENTS

Figure 1:
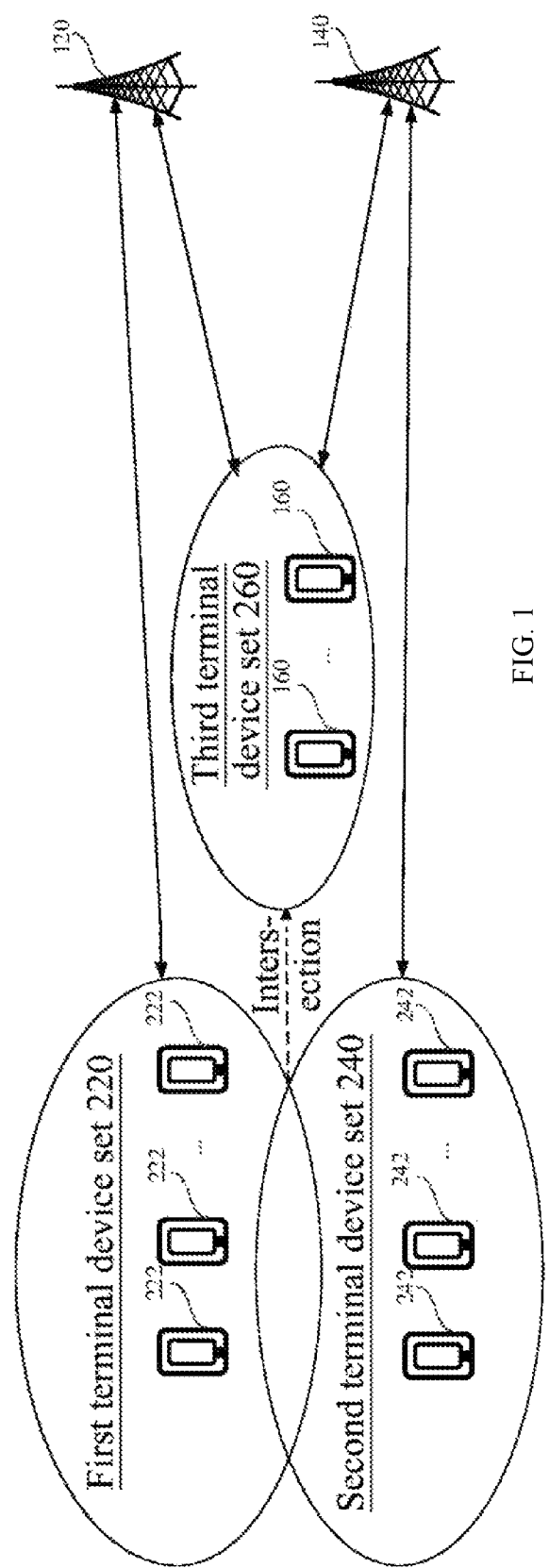
FIG. 1 is a schematic diagram of an implementation environment according to an exemplary embodiment of the present disclosure.

To make the purposes, technical solutions, and advantages of the present disclosure clearer, implementations of the present disclosure will be further described in detail below with reference to the accompanying drawings.

The words such as "first", "second" and the like, as mentioned herein, are not intended to indicate any order, quantity, or importance, but are used to distinguish different components. Similarly, the words such as "a" or "an" and the like do not indicate a quantity limitation, but indicate that there is at least one. The words such as "connect" or "connected" and the like are not limited to physical or mechanical connections, but may include electrical connections, either direct or indirect.

The word "module" as mentioned herein generally refers to a program or an instruction stored in a memory and capable of performing certain functions; the word "unit" as mentioned herein generally refers to a logically divided functional structure, and the "unit" can be implemented by only hardware or a combination of hardware and software.

The word "multiple" as mentioned herein means two or more than two. The expression "and/or" describes an association relationship of associated objects, which indicates that there may be three relationships. For example, A and/or B may indicate three cases where A exists separately, A and B exist at the same time, and B exists separately. The character "/" generally indicates that there is an "or" relationship between contextual objects.

First, several terms related to embodiments of the present disclosure will be introduced below.

1. A first carrier is a downlink carrier scheduled by a first access network device to transmit first downlink information. In an embodiment, the first carrier includes one of a TDD carrier and an FDD downlink carrier.

2. A second carrier is a downlink carrier scheduled by a second access network device to transmit second downlink information. In an embodiment, the second carrier includes one of a TDD carrier and an FDD downlink carrier.

Here, the first carrier is different from the second carrier. The expression "the first carrier is different from the second carrier" means that the first carrier and the second carrier are not the same carrier, but two independent carriers. The first carrier and the second carrier may be the same type of carrier, or may be different types of carriers. The following only takes the first carrier and the second carrier being, two independent carriers of the same type as an example for illustration.

3. A target carrier is used to transmit first uplink information to the first access network device, and/or to transmit second uplink information to the second access network device. In an embodiment, the target carrier includes one of a TDD carrier and an FDD uplink carrier.

In an embodiment, the target carrier is an uplink carrier configured by the first access network device for a terminal device to transmit the first uplink information and/or the second uplink information; or, the target carrier is an uplink carrier pre-specified or configured from multiple uplink carriers configured by the first access network device for the terminal device to transmit the first uplink information and/or the second uplink information; or, the target carrier is a primary uplink carrier of the terminal device.

In an embodiment, when the first carrier is a TDD carrier, the target carrier is a carrier as same as the first carrier.

In an embodiment, when the first carrier is an FDD downlink carrier, the target carrier is an uplink carrier paired with the first carrier. Illustratively, the pairing relationship between the first carrier and the target carrier is a pre-configured or protocol-defined pairing relationship between a downlink carrier and an uplink carrier. In the pairing relationship, one uplink carrier corresponds to one downlink carrier.

4. A first uplink channel is configured to transmit the first uplink information to the first access network device on the target carrier.

In an embodiment, the first uplink channel is an uplink channel based on a first communication protocol.

In an embodiment, the first uplink channel is a PUCCH. Illustratively, the PUCCH is any one of the following: PUCCH format 1, PUCCH format 1a, PUCCH format 1b, PUCCH format 2, PUCCH format 2a, PUCCH format 2b, PUCCH format 3, PUCCH format 4, and PUCCH format 5.

In an embodiment, the first uplink channel is a Physical Uplink Shared Channel (PUSCH).

5. A second uplink channel is configured to transmit the second uplink information to the second access network device on the target carrier.

In an embodiment, the second uplink channel is an uplink channel based on the first communication protocol or a second communication protocol.

In an embodiment, the second uplink channel is a PUCCH. Illustratively, the second uplink channel is any one of the following: PUCCH format 1, PUCCH format 1a, PUCCH format 1b, PUCCH format 2, PUCCH format 2a, PUCCH format 2b, PUCCH format 3, PUCCH format 4, PUCCH format 5, 1-symbol NR PUCCH, 2-symbol NR PUCCH and long NR PUCCH.

In an embodiment, the second uplink channel is a PUSCH.

Here, the first uplink channel is different from the second uplink channel. That is to say, the first uplink channel and the second uplink channel are two independent uplink channels in the target carrier.

6. The first uplink information includes: first uplink control information UCI and uplink traffic data, where the first uplink control information UCI includes, but is not limited to, at least one of:

(1) an ACK corresponding to the first downlink information;
(2) a NACK corresponding to the first downlink information;
(3) Channel state information (CSI) of the first carrier; and
(4) an SR.

The channel state information CSI of the first carrier includes, but is not limited to, at least one of:

(1) a CQI of the first carrier;
(2) a precoding matrix indicator (PMI);
(3) a rank indication (RI); and
(4) a channel state information reference signal resource indicator (CSI-RS resource indicator, CRI).

7. The second uplink information includes: at least one of an ACK/NACK corresponding to the second downlink information and a CQI of the second carrier.

8. A transmission parameter of the first uplink information includes first channel resource indication information which is used to indicate a time-domain resource location and/or a frequency-domain resource location of a physical channel that is configured to transmit the first uplink information on the target carrier.

9. A transmission parameter of the second uplink information includes second channel resource indication information which is used to indicate a time-domain resource location and/or a frequency-domain resource location of a physical channel that is configured to transmit the second uplink information on the target carrier.

For some terms involved in the embodiments of the present disclosure, such as the ACK/NACK, CSI, SR, CQI, etc., reference may be made to corresponding descriptions in the 3GPP protocol, which will not be described herein again.

Reference may be made to FIG. 1 which shows a schematic diagram of an implementation environment according to an exemplary embodiment of the present disclosure. The implementation environment includes at least two mobile communication systems, where one of the mobile communication systems may be an LTE system or an LTE-A system, and the other one of the mobile communication systems is a 5G system, also known as an NR system, which is not limited in this embodiment. The implementation environment includes: a first access network device 120, a second access network device 140, and at least one terminal device 160.

The first access network device 120 may be a base station which may be used for a conversion between a received radio frame and an IP packet and also for a coordination of attribute management of an air interface. The first access network device 120 is configured to transmit, on a first carrier, first downlink information to at least one terminal device 160 based on a first communication protocol. In an embodiment, the first communication protocol includes an LTE protocol.

In an embodiment, the first access network device 120 is an evolutional Node B (eNB or e-NodeB) in LTE. A specific implementation of the first access network device 120 is not limited in the embodiment of the present disclosure.

In an embodiment, a wireless connection is established between the first access network device 120 and the at least one terminal device 160 via a radio air interface. In an embodiment, the radio air interface may also be a radio air interface based on a 4G standard (an LTE system). The first access network device 120 may receive, via the wireless connection, first uplink information transmitted by the at least one terminal device 160.

The second access network device 140 may be a base station which may be used for a conversion between a received radio frame and an IP packet and also for a coordination of attribute management of an air interface. The second access network device 140 is configured to transmit, on a second carrier, second downlink information to the at least one terminal device 160 based on a second communication protocol.

The first communication protocol is different from the second communication protocol. In an embodiment, the second communication protocol includes an NR protocol. Below, an example for illustration is only taken as follows: the first communication protocol includes the LTE protocol, and the second communication protocol includes the NR protocol, that is, the first access network device 120 is a base station based on the LIE protocol, and the second access network device 140 is a base station based on the NR protocol.

In an embodiment, the second access network device 140 is a base station that adopts a centralized distribution architecture in a 5G system. The second access network device 140 typically includes a central unit (CU) and at least two distributed units (DU). The central unit is provided with a packet data convergence protocol (PDCP) layer, a radio link control (RLC) layer, and a media access control (MAC) layer protocol stacks; the distributed units are provided with a physical layer (Physical, PHY) protocol stack, and a specific implementation of the second access network device 140 is not limited in the embodiment of the present disclosure.

In an embodiment, a wireless connection is established between the second access network device 140 and the at least one terminal device 160 via a radio air interface. In an embodiment, the radio air interface is a radio air interface based on a 5G standard, for example, the radio air interface is a new radio (NR); or the radio air interface may also be a radio air interface based on a 5G-based next-generation mobile communication network technology standard. The second access network device 140 may receive, via the wireless connection, second uplink information transmitted by the at least one terminal device 160.

It should be noted that the implementation environment includes a first terminal device set 220 and a second terminal device set 240. The first terminal device set 220 includes n terminal devices 222 which are devices performing data communications with the first access network device 120, where n is a positive integer. The second terminal device set 240 includes m terminal devices 242, where the m terminal devices 242 are devices performing data communications with the second access network device 140, where m is a positive integer. Here, the first terminal device set 220 and the second terminal device set 240 have an intersection and the intersection is a third terminal device set 260. The third terminal device set 260 includes at least one terminal device 160 which is a device performing data communications with the first network access device 120 and with the second access network device 140.

Below, the terminal device involved in the embodiment of the present disclosure is the terminal device 160. That is to say, the at least one terminal device 160 is configured to receive, via the wireless connection with the first access network device 120, the first downlink information transmitted by the first access network device 120, and/or transmit the first uplink information to the first access network device 120; the at least one terminal device 160 is further configured to receive, via the wireless connection with the second access network device 140, the second downlink information transmitted by the network device 140, and/or transmit the second uplink information to the second access network device 140.

In an embodiment, the terminal device 160 may communicate with one or more core networks via a radio access network (RAN), and the terminal device 160 may be a mobile terminal, such as a mobile phone (or referred to as a "cellular" phone), and a computer having the mobile terminal, for example, a portable, pocket, handheld, computer built-in or in-vehicle mobile device, such as a subscriber unit, a subscriber station, a mobile station, a mobile, a remote station, an access point, a remote terminal, an access terminal, a user terminal, a user agent, a user device, or user equipment (UE). In an embodiment, the terminal device 160 may also be a Relay device, which is not limited in this embodiment.

Figure 2:
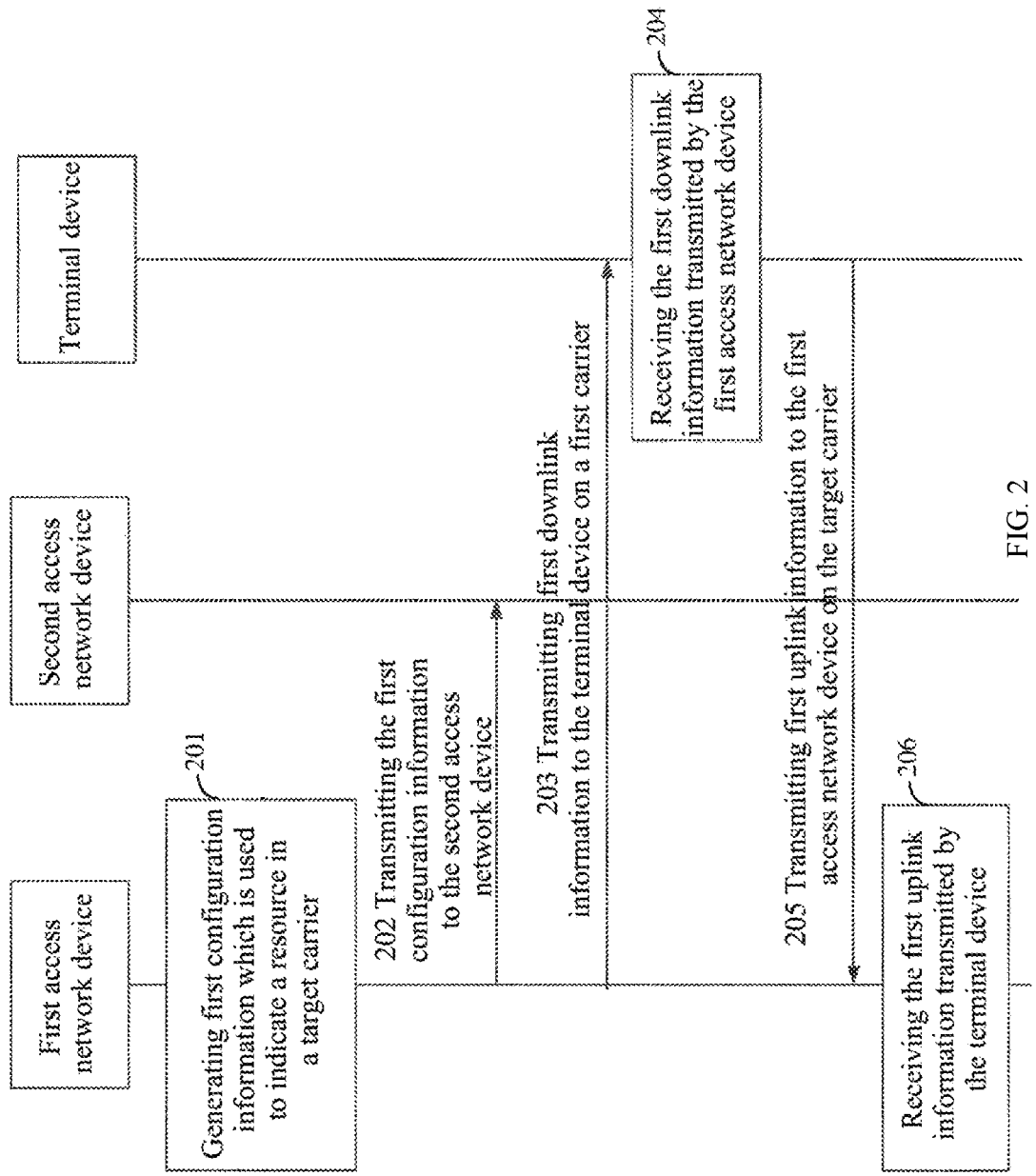
FIG. 2 is a flow chart of a method for uplink information transmission according to an exemplary embodiment of the present disclosure.

It should be noted that, in the implementation environment shown in FIG. 1, multiple first access network devices 120 may be included, multiple second access network devices 140 may be included, and multiple terminal devices 160 may also be included. In FIG. 2, illustration is made by taking one first access network device 120, one second access network device 140, and at least one terminal device 160 as an example, but this is not limited in the present embodiment. Below, an example of only one first access network device 120, one second access network device 140, and one terminal device 160 is taken for illustration.

Reference may be made to FIG. 2 which is a flow chart of a method for uplink information transmission according to an exemplary embodiment of the present disclosure, and the method is used in the implementation environment shown in FIG. 1. The method includes the following steps.

Step 201: the first access network device generates first configuration information which is used to indicate a resource in a target carrier.

In an embodiment, the first configuration information is used to indicate a resource in a target carrier, where the resource in the target carrier is a resource that is used, in the target carrier, for transmitting second uplink information. In other words, the resource is a physical resource configured by the first access network device for the second access network device to transmit the second uplink information.

In an embodiment, the resource in the target carrier has a corresponding relationship with the second uplink information.

Here, the resource in the target carrier includes, but is not limited to, at least one of a time-domain resource, a frequency-domain resource, and a code-domain resource in the target carrier.

In a possible implementation, the first configuration information is used to indicate a first frequency-domain resource set in the target carrier. The first frequency-domain resource set in each uplink slot or each uplink subframe in the target carrier is reserved for the second access network device such that the second access network device receives the second uplink information on a resource in the first frequency-domain resource set, and the first access network device cannot schedule the resource in the first frequency-domain resource set.

In another possible implementation, the first configuration information is used to indicate a first time-domain resource set and a second frequency-domain resource set. The second frequency-domain resource set in each time slot or each subframe included in the first time-domain resource set in the target carrier is reserved for the second access network device such that the second access network device receives the second uplink information on a resource in the second frequency-domain resource set, and the first access network device cannot schedule the resource in the second frequency-domain resource set.

In another possible implementation, the first configuration information is used to indicate a first time-frequency resource set. The first time-frequency resource set in the target carrier is reserved for the second access network device such that the second access network device receives the second uplink information on a resource in the first time-frequency resource set, and the first access network device cannot schedule the resource in the first time-frequency resource set.

Step 202: the first access network device transmits the first configuration information to the second access network device.

Correspondingly, the second access network device receives the first configuration information transmitted by the first access network device, and the second access network device is configured to determine, according to the first configuration information, a resource in a target carrier, and receive, on the resource, the second uplink information transmitted by the terminal device.

Step 203: the first access network device transmits first downlink information to the terminal device on a first carrier.

In an embodiment, the first access network device transmits, on a first carrier, first downlink information to the terminal device based on an LTE protocol.

In an embodiment, the first access network device transmits, over a first downlink channel on the first carrier, first downlink information to the terminal device based on an LTE protocol. Illustratively, the first downlink channel includes a physical downlink shared channel (PDSCH).

Step 204: the terminal device receives the first downlink information transmitted by the first access network device.

In an embodiment, the terminal device receives, on the first carrier based on the LTE protocol, the first downlink information transmitted by the first access network device.

Here, the receiving, by the terminal device, the first downlink information includes two possible situations. In the first possible situation, the terminal device receives the first downlink information on the first carrier; and in the second possible situation, the terminal device receives no first downlink information on the first carrier.

Step 205: the terminal device transmits first uplink information to the first access network device on the target carrier.

In an embodiment, when the terminal device receives the first downlink information on the first carrier, the terminal device transmits, on the target carrier, the first uplink information to the first access network device based on the LTE protocol.

In an embodiment, the terminal device transmits, on the target carrier, the first uplink information to the first access network device using a first uplink channel.

Step 206: the first access network device receives the first uplink information transmitted by the terminal device.

In an embodiment, the first access network device receives the first uplink information that is transmitted by the terminal device on the target carrier based on the LTE protocol by using the first uplink channel.

In summary, in the embodiment of the present disclosure, after receiving, on a first carrier based on a first communication protocol, first downlink information transmitted by a first access network device and receiving, on a second carrier based on a second communication protocol, second downlink information transmitted by a second access network device, a terminal device transmits, on a target carrier, first uplink information to the first access network device based on the first communication protocol and second uplink information to the second access network device such that the terminal device receives, in a dual connectivity scenario, the first downlink information and the second downlink information respectively on the two carriers; when there is a need to simultaneously transmit first uplink information corresponding to the first downlink information and second uplink information corresponding to the second downlink information, the terminal device can simultaneously transmit the first uplink information and the second uplink information over one uplink carrier, i.e. the target carrier, thereby avoiding harmonics or intermodulation interference due to simultaneous transmission of two carriers, such as an LTE carrier and an NR carrier, and implementing normal and timely uplink information transmission under the premise of reduction of terminal costs.

It should be noted that, before the terminal device transmits the first uplink information over the first uplink channel on the target carrier, the terminal device needs to determine a transmission parameter of the first uplink information.

Figure 3:
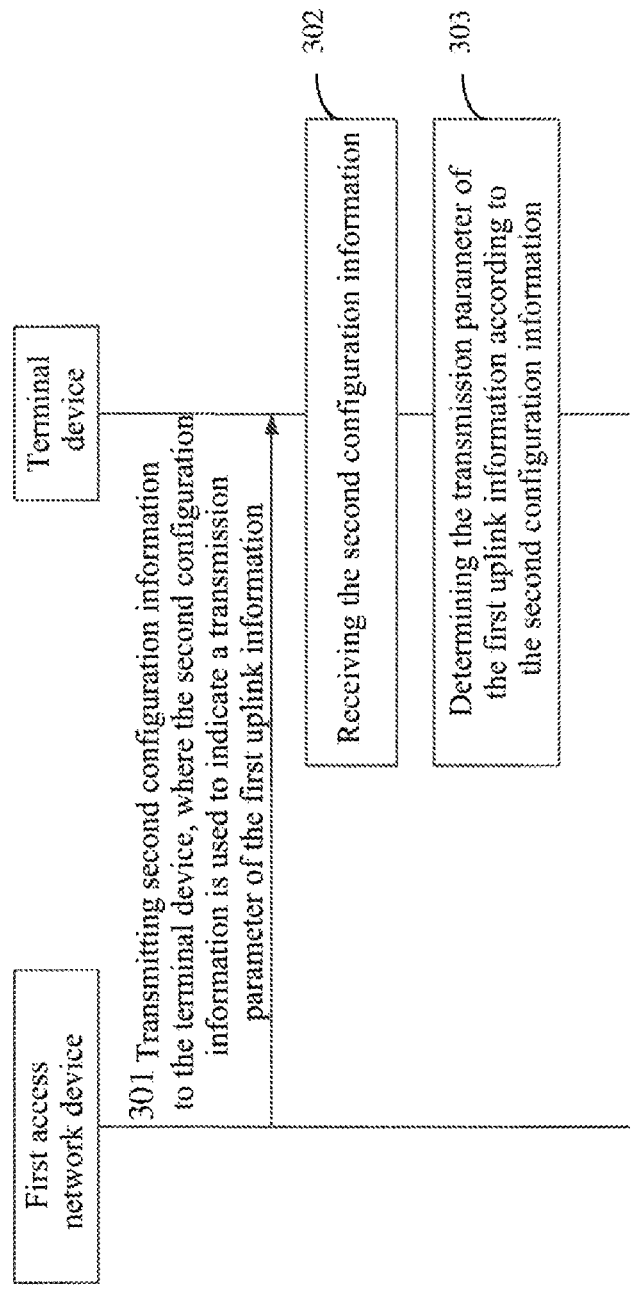
FIG. 3 is a flow chart of a method for determining a transmission parameter of first uplink information involved in a method for uplink information transmission according to an exemplary embodiment of the present disclosure.

In a possible implementation, as shown in FIG. 3, the terminal device determines a transmission parameter of the first uplink information, including but not limited to the following steps:

Step 301: the first access network device transmits second configuration information to the terminal device, where the second configuration information is used to indicate a transmission parameter of the first uplink information.

Step 302: the terminal device receives the second configuration information.

Step 303: the terminal device determines the transmission parameter of the first uplink information according to the second configuration information.

In an embodiment, the terminal device determines the transmission parameter of the first uplink information according to the received second configuration information that is transmitted by the first access network device, where the transmission parameter of the first uplink information includes first channel resource indication information which is used to indicate at least one of a time-domain resource, a frequency-domain resource, and a time-frequency resource of the first uplink channel on the target carrier.

For example, the first channel resource indication information is used to indicate a time-frequency resource A36 of a first uplink channel on a target carrier A, and the time-frequency resource A36 is used to transmit the first uplink information.

Figure 4:
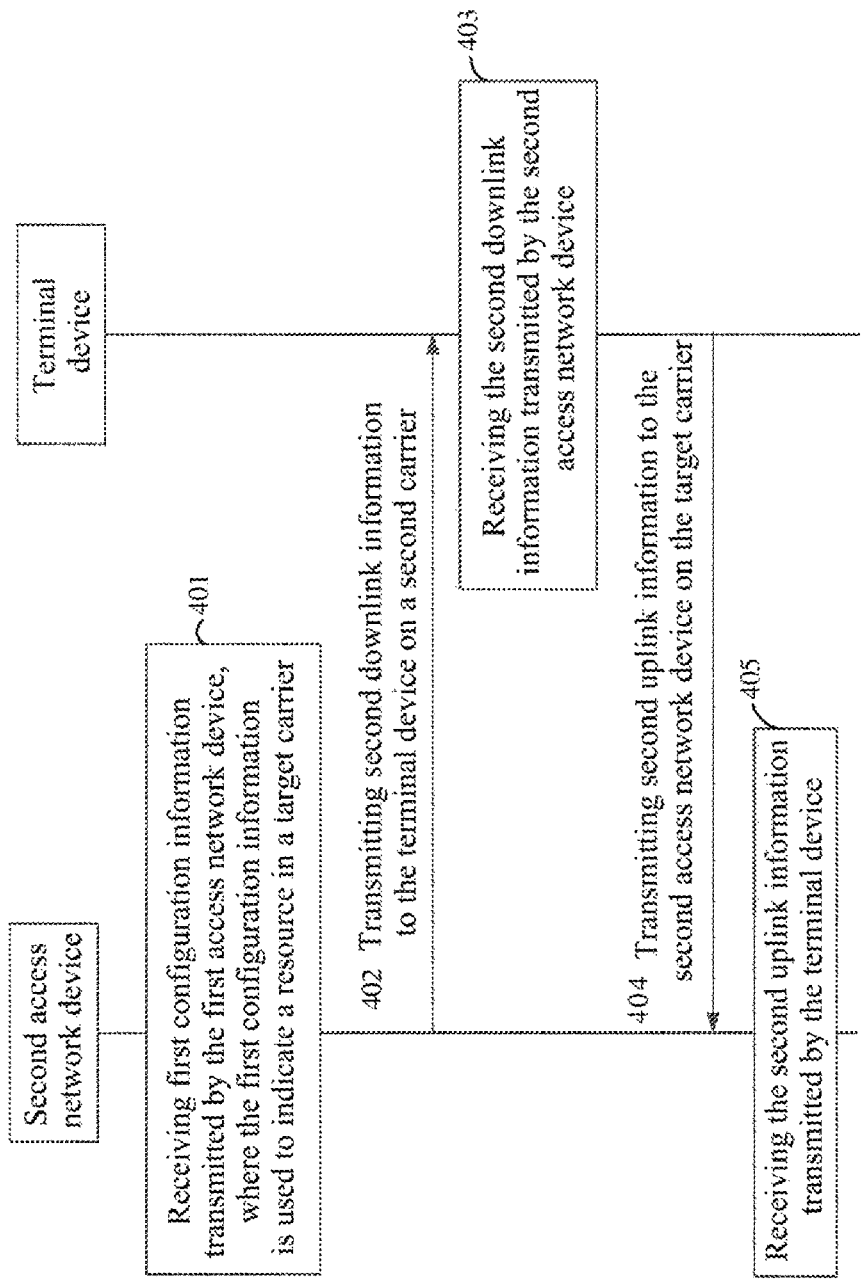
FIG. 4 is a flow chart of a method for uplink information transmission according to another exemplary embodiment of the present disclosure.

Reference may be made to FIG. 4 which shows a flow chart of a method for uplink information transmission according to an exemplary embodiment of the present disclosure, and the method is used in the implementation environment shown in FIG. 1. The method includes the following steps.

Step 401: the second access network device receives first configuration information transmitted by the first access network device, where the first configuration information is used to indicate a resource in a target carrier.

Step 402: the second access network device transmits second downlink information to the terminal device on a second carrier.

In an embodiment, the second access network device transmits, on the second carrier, the second downlink information to the terminal device based on an NR protocol.

In an embodiment, the second access network device transmits, over a second downlink channel on the second carrier, the second downlink information to the terminal device based on the NR protocol. Illustratively, the second downlink channel includes a PDSCH.

Step 403: the terminal device receives the second downlink information transmitted by the second access network device.

In an embodiment, the terminal device receives, on the second carrier based on the NR protocol, the second downlink information transmitted by the second access network device.

In an embodiment, the receiving, by the terminal device, the second downlink information includes two possible situations. In a first possible situation, the terminal device receives the second downlink information on the second carrier; and in a second possible situation, the terminal device receives no second downlink information on the second carrier.

Step 404: the terminal device transmits second uplink information to the second access network device on the target carrier.

In an embodiment, when the terminal device receives the second downlink information on the second carrier, the terminal device transmits, on the target carrier, the second uplink information to the second access network device based on the LTE protocol or the NR protocol.

In an embodiment, the terminal device transmits, on the target carrier, the second uplink information to the second access network device using a second uplink channel.

Step 405: the second access network device receives the second uplink information transmitted by the terminal device.

In an embodiment, the second access network device receives, on the target carrier based on the LTE protocol or the NR protocol, the second uplink information that is transmitted by the terminal device by using the second uplink channel.

In summary, the embodiment of the present disclosure further allows a first access network device to transmit first configuration information which is used to indicate a resource in a target carrier to a second access network device, such that the second access network may receive, in the resource, second uplink information transmitted by a terminal device, ensuring that the first access network device and the second access network device receive, over a same target carrier, uplink data transmitted by the terminal device.

It should be noted that, before the terminal device transmits the second uplink information over the second uplink channel on the target carrier, the terminal device needs to determine a transmission parameter of the second uplink information.

In an embodiment, the terminal device determines a transmission parameter of the second uplink information, including but not limited to the following possible implementations.

Figure 5:
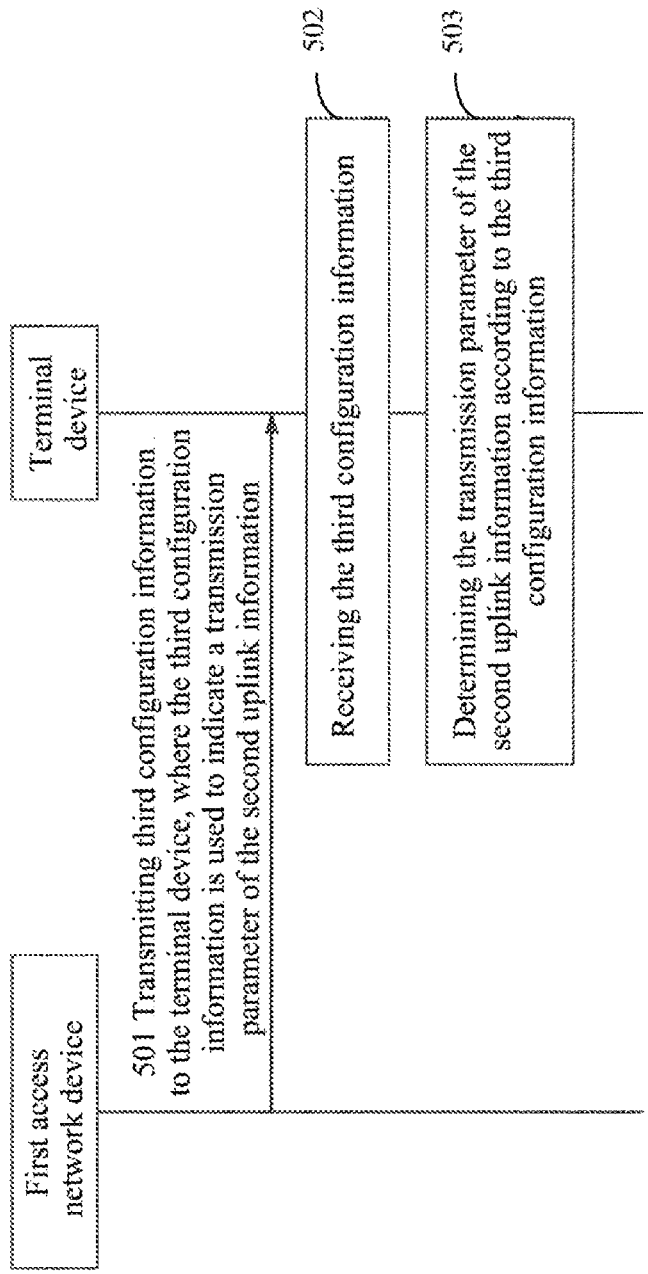
FIG. 5 is a flow chart of a method for determining a transmission parameter of second uplink information involved in a method for uplink information transmission according to an exemplary embodiment of the present disclosure.

In a first possible implementation, as shown in FIG. 5, the following steps are included but of no limitation:

Step 501: the first access network device transmits third configuration information to the terminal device, where the third configuration information is used to indicate a transmission parameter of the second uplink information.

Step 502: the terminal device receives the third configuration information.

Step 503: the terminal device determines the transmission parameter of the second uplink information according to the third configuration information.

In an embodiment, the terminal device determines, according to the received third configuration information that is transmitted by the first access network device, a transmission parameter of the second uplink information, where the transmission parameter of the second uplink information includes second channel resource indication information which is used to indicate at least one of a time-domain resource, a frequency-domain resource, and a time-frequency resource of the second uplink channel on the target carrier.

For example, the second channel resource indication information is used to indicate a time-frequency resource A22 of a second uplink channel on a target carrier A, where the time-frequency resource A22 is used to transmit the second uplink information.

Figure 6:
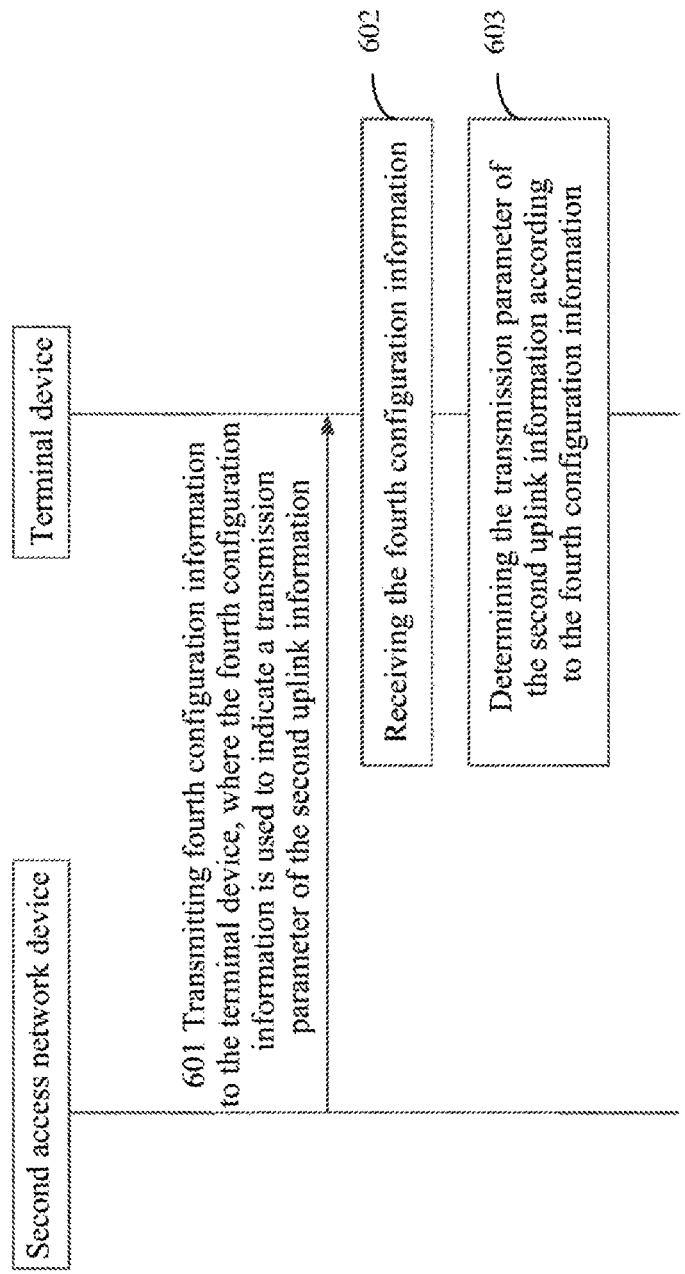
FIG. 6 is a flow chart of a method for determining a transmission parameter of second uplink information involved in a method for uplink information transmission according to another exemplary embodiment of the present disclosure.

In a second possible implementation, as shown in FIG. 6, the following steps are included but of no limitation:

Step 601: the second access network device transmits fourth configuration information to the terminal device, where the fourth configuration information is used to indicate a transmission parameter of the second uplink information.

Step 602: the terminal device receives the fourth configuration information.

Step 603: the terminal device determines the transmission parameter of the second uplink information according to the fourth configuration information.

For example, the terminal device determines, according to the received fourth configuration information that is transmitted by the second access network device, second channel resource indication information which is used to indicate at least one of a time-domain resource, a frequency-domain resource, and a time-frequency resource of the second uplink channel on the target carrier.

For example, the second channel resource indication information is used to indicate a time-frequency resource A57 of a second uplink channel on a target carrier A, where the time-frequency resource A57 is used to transmit the second uplink information.

Figure 7:
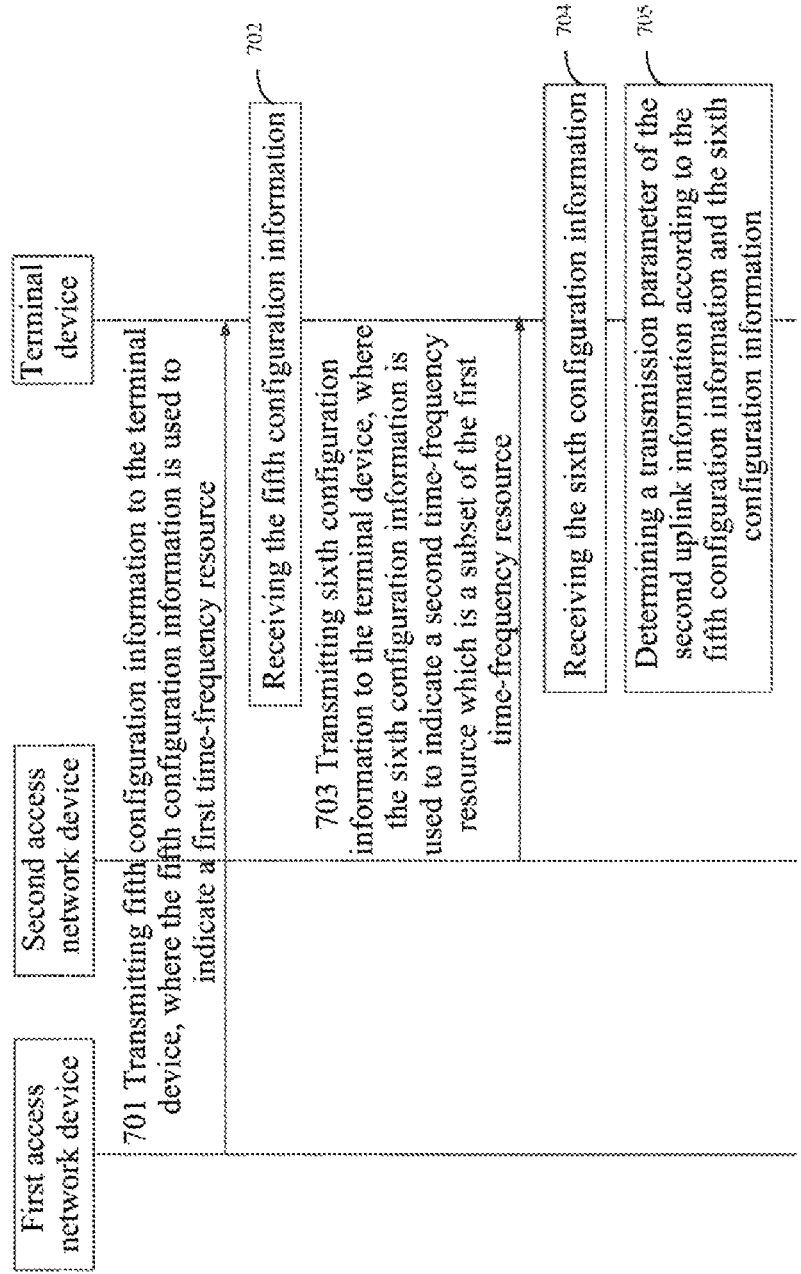
FIG. 7 is a flow chart of a method for determining a transmission parameter of second uplink information involved in a method for uplink information transmission according to another exemplary embodiment of the present disclosure.

In a third possible implementation, as shown in FIG. 7, the following steps are included but of no limitation:

Step 701: the first access network device transmits fifth configuration information to the terminal device, where the fifth configuration information is used to indicate a first time-frequency resource.

Step 702: the terminal device receives the fifth configuration information.

Step 703: the second access network device transmits sixth configuration information to the terminal device, where the sixth configuration information is used to indicate a second time-frequency resource which is a subset of the first time-frequency resource.

Step 704: the terminal device receives the sixth configuration information.

It should be noted that Step 701 and Step 702 can be performed in parallel with Step 703 and Step 704. A receiving sequence in which the terminal device receives the fifth configuration information and the sixth configuration information is not limited in this embodiment.

Step 705: the terminal device determines a transmission parameter of the second uplink information according to the fifth configuration information and the sixth configuration information.

For example, the terminal device determines a first time-frequency resource A40 on a target carrier A according to the received fifth configuration information that is transmitted by the first access network device, where the first time-frequency resource A40 includes a time-frequency resource A42, a time-frequency resource A43, a time-frequency resource A47 and a time-frequency resource A49, and the terminal device further determines, from the first time-frequency resource A40, a second time-frequency resource, i.e. the time-frequency resource A49 according to the received sixth configuration information that is transmitted by the second access network device, where the time-frequency resource A49 is used to transmit the second uplink information.

Below, an example for illustration is taken as follows: when a terminal device receives first downlink information on a first carrier and receives second downlink information on a second carrier, first uplink information and second uplink information need to be simultaneously transmitted at this time.

Figure 8:
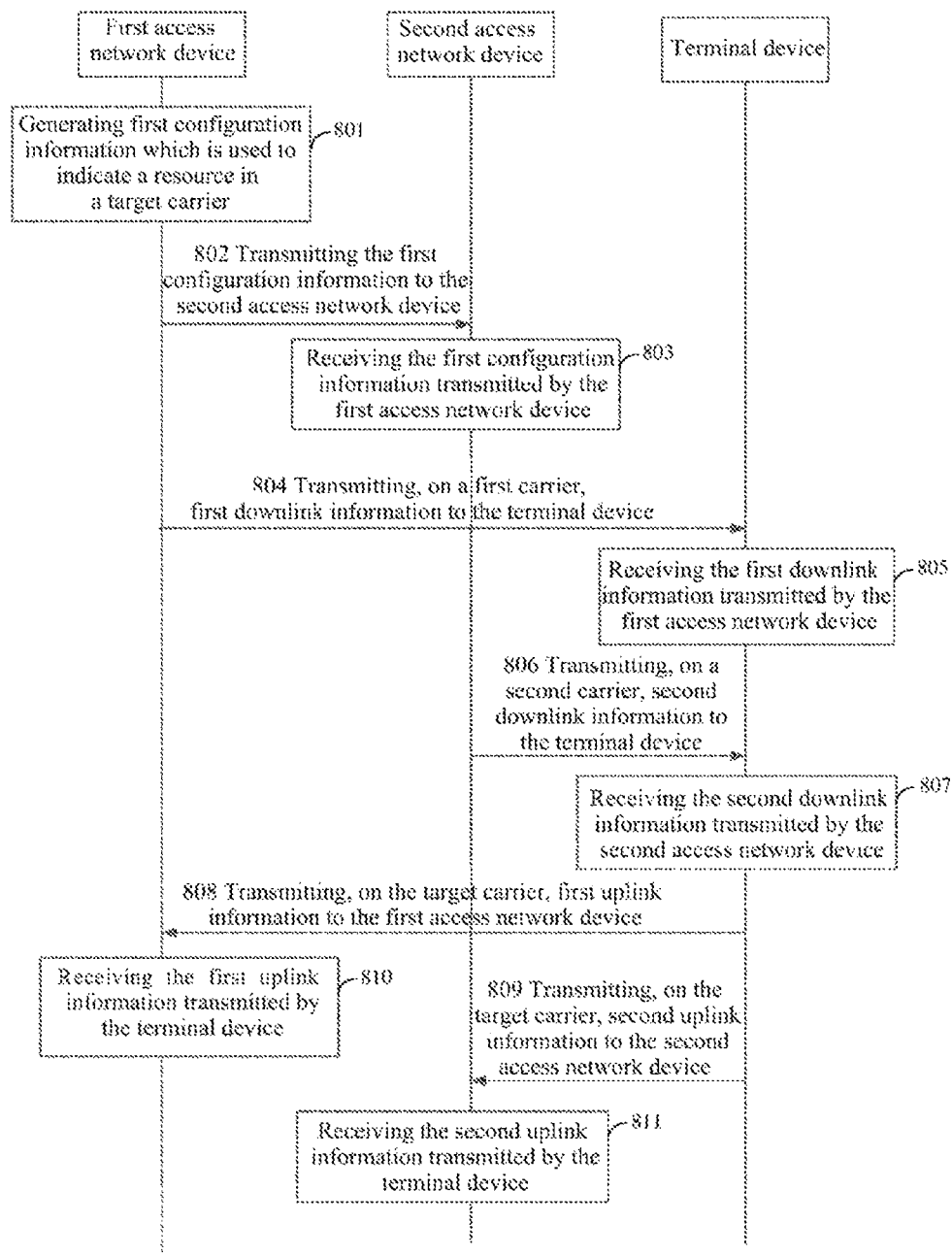
FIG. 8 is a flow chart of a method for uplink information transmission according to another exemplary embodiment of the present disclosure.

Reference may be made to FIG. 8 which shows a flow chart of a method for uplink information transmission according to an exemplary embodiment of the present disclosure, and the method is used in the implementation environment shown in FIG. 1. The method includes the following steps.

Step 801: a first access network device generates first configuration information which is used to indicate a resource in a target carrier.

Step 802: the first access network device transmits the first configuration information to a second access network device.

Step 803: the second access network device receives the first configuration information transmitted by the first access network device.

Step 804: the first access network device transmits, on a first carrier, first downlink information to a terminal device.

Step 805: the terminal device receives the first downlink information transmitted by the first access network device.

Step 806: the second access network device transmits, on a second carrier, second downlink information to the terminal device.

Step 807: the terminal device receives the second downlink information transmitted by the second access network device.

It should be noted that Step 804 and Step 805 can be performed in parallel with Step 806 and Step 807. A receiving sequence in which the terminal device receives the first downlink information on the first carrier and the second downlink information on the second carrier is not limited in this embodiment.

Step 808: the terminal device transmits, on the target carrier, first uplink information to the first access network device.

Step 809: the terminal device transmits, on the target carrier, second uplink information to the second access network device.

It should be noted that Step 808 can be performed in parallel with Step 809. That is to say, the terminal device simultaneously transmits, on the target carrier, the first uplink information to the first access network device and the second uplink information to the second access network device.

In a first possible transmission method, the terminal device transmits the first uplink information and the second uplink information over a same uplink channel in a same uplink subframe on the target carrier.

In a second possible transmission method, the terminal device transmits the first uplink information and the second uplink information over different uplink channels on the target carrier.

In an embodiment, the terminal device transmits, on the target carrier, the first uplink information to the first access network device using a first uplink channel and the second uplink information to the second access network device using a second uplink channel. The embodiment of the present disclosure is described by taking only the second possible transmission method as an example.

Before the terminal device transmits the first uplink information and the second uplink information over different uplink channels on the target carrier, the terminal device needs to determine a transmission parameter of the first uplink information and a transmission parameter of the second uplink information.

For example, after the terminal device determines the transmission parameter "time-frequency resource A36" of the first uplink information and the transmission parameter "time-frequency resource A49" of the second uplink information, the terminal device transmits, on a target carrier A based on the LTE protocol, the first uplink information to the first access network device using the time-frequency resource A36 and transmits, on the target carrier A based on the NR protocol, the second uplink information to the second access network device using the time-frequency resource A49.

Step 810: the first access network device receives the first uplink information transmitted by the terminal device.

For example, the first access network device receives the first uplink information on the time-frequency resource A36 on the target carrier A.

Step 811: the second access network device receives the second uplink information transmitted by the terminal device.

For example, the second access network device receives the second uplink information on the time-frequency resource A49 on the target carrier A.

It should be noted that Step 810 can be performed in parallel with the Step 811. A receiving sequence in which the first access network device receives the first uplink information and the second access network device receives the second uplink information is not limited in the embodiment of the present disclosure.

Figure 9:
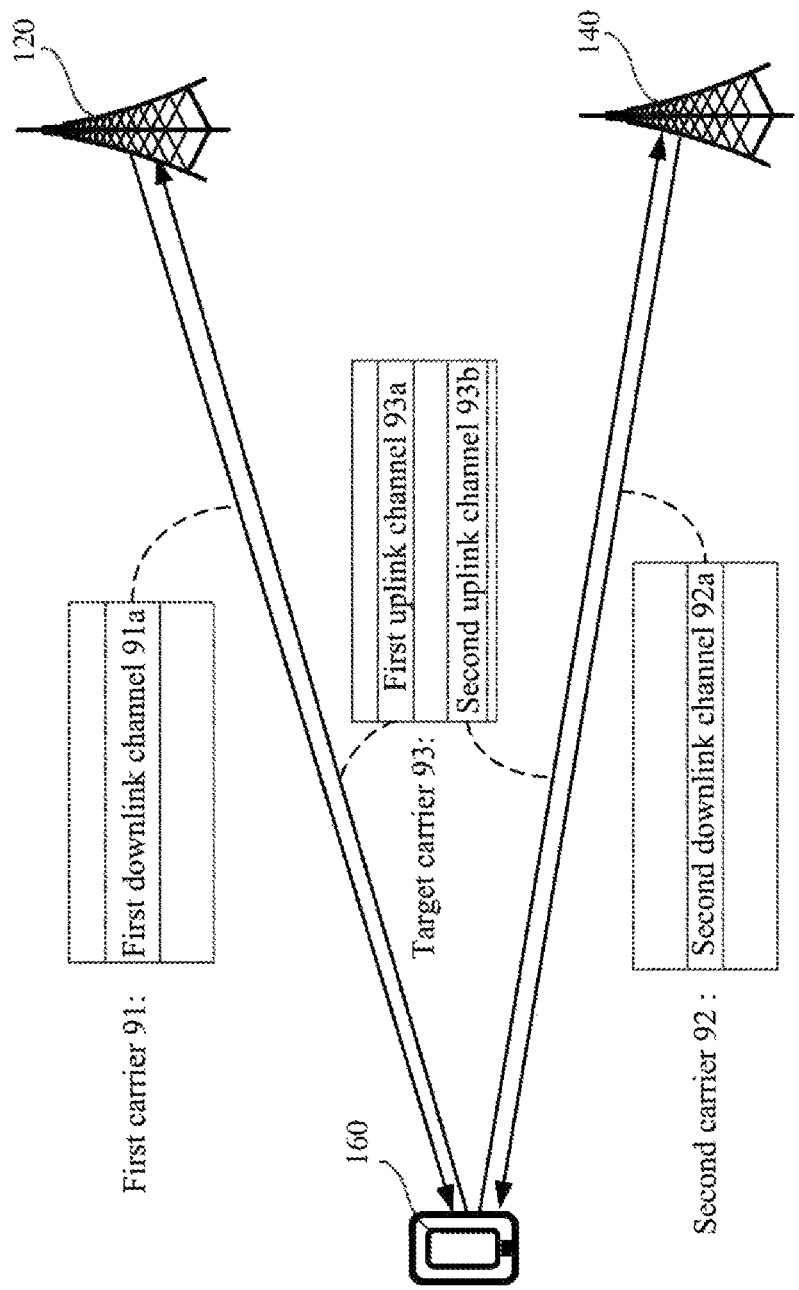
FIG. 9 is a schematic diagram of a principle of a method for uplink information transmission according to another exemplary embodiment of the present disclosure.

In an illustrative example, as shown in FIG. 9, the terminal device 160 receives, over a first downlink channel 91a (e.g., PDSCH1) on a first carrier 91, first downlink information transmitted by the first access network device 120, and receives, over a second downlink channel 92a (e.g., PDSCH2) on a second carrier 92, second downlink information transmitted by the second access network device 140, where the first carrier 91 is an LTE downlink carrier, and the second carrier 92 is an NR carrier. A target carrier 93 is a pre-configured LTE uplink carrier paired with the first carrier 91. The terminal device 160 transmits, over a first uplink channel 93a (for example, PUCCH1) on the target carrier 93, first uplink information corresponding to the PDSCH1 to the first access network device 120, and transmits, over a second uplink channel 93b (for example, PUCCH2) on the target carrier 93, second uplink information corresponding to the PDSCH2 to the second access network device 140. Correspondingly, the first access network device 120 receives on the target carrier 93 the first uplink information, and the second access network device 140 receives on the target carrier 93 the second uplink information.

The following shows an apparatus embodiment of the present disclosure. For parts that are not elaborated in the apparatus embodiment, reference may be made to the technical details disclosed in the foregoing method embodiments.

Figure 10:
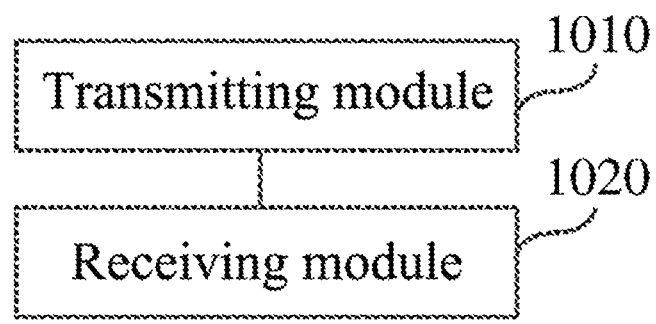
FIG. 10 is a schematic structural diagram of apparatus for uplink information transmission according to an embodiment of the present disclosure.

Reference may be made to FIG. 10 which shows a schematic structural diagram of apparatus for uplink information transmission according to an embodiment of the present disclosure. The apparatus for the uplink information transmission may be implemented as all or a part of a terminal device by software, hardware, and a combination of both. The apparatus for the uplink information transmission includes: a transmitting module 1010 and a receiving module 1020.

The transmitting module 1010 is configured to perform Steps 202, 203, 301, 501, 701, 802, and 804 as described above and other explicit or implicit functions of at least one transmitting step performed by the first access network device.

The receiving module 1020 is configured to perform Steps 206 and 810 as described above and other explicit or implicit functions of at least one receiving step performed by the first access network device.

Figure 11:
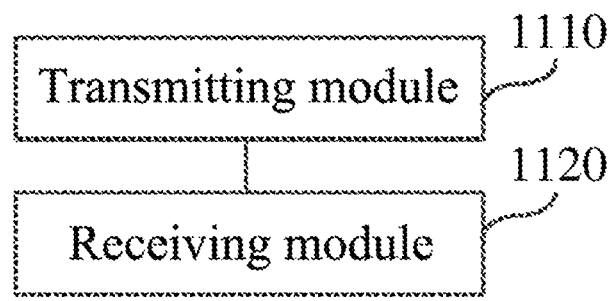
FIG. 11 is a schematic structural diagram of apparatus for uplink information transmission according to another embodiment of the present disclosure.

Reference may be made to FIG. 11 which shows a schematic structural diagram of apparatus for uplink information transmission according to an embodiment of the present disclosure. The apparatus for the uplink information transmission can be implemented as all or a part of an access network device by software, hardware, and a combination of both. The apparatus for the uplink information transmission includes: a transmitting module 1110 and a receiving module 1120.

The transmitting module 1110 is configured to perform Steps 402, 601, 703, and 806 and other explicit or implicit functions of at least one transmitting step performed by the second access network device.

The receiving module 1120 is configured to perform Steps 401, 405, 803, and 811 as described above and other explicit or implicit functions of at least one receiving step performed by the second access network device.

Figure 12:
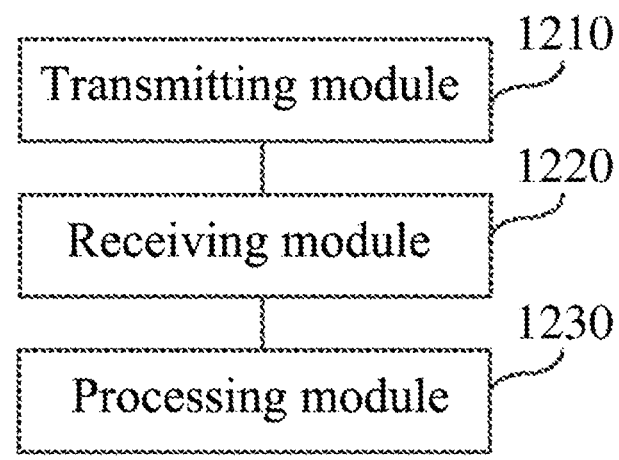
FIG. 12 is a schematic structural diagram of apparatus for uplink information transmission according to another embodiment of the present disclosure.

Reference may be made to FIG. 12 which shows a schematic structural diagram of apparatus for uplink information transmission according to an embodiment of the present disclosure. The apparatus for the uplink information transmission can be implemented as all or a part of an access network device by software, hardware, and a combination of both. The apparatus for the uplink information transmission includes: a transmitting module 1210 and a receiving module 1220.

The transmitting module 1210 is configured to perform Steps 205, 302, 404, 808, and 809 as described above and other explicit or implicit functions of at least one transmitting step performed by the terminal device.

The receiving module 1220 is configured to perform Steps 204, 403, 502, 602, 702, 704, 805, and 807 as described above and other explicit or implicit functions of at least one receiving step performed by the terminal device.

In an embodiment, the apparatus further includes a processing module 1230.

The processing module 1230 is configured to perform Steps 303, 503, 603, 705 as described above and other explicit or implicit functions of at least one processing step performed by the terminal device.

Figure 13:
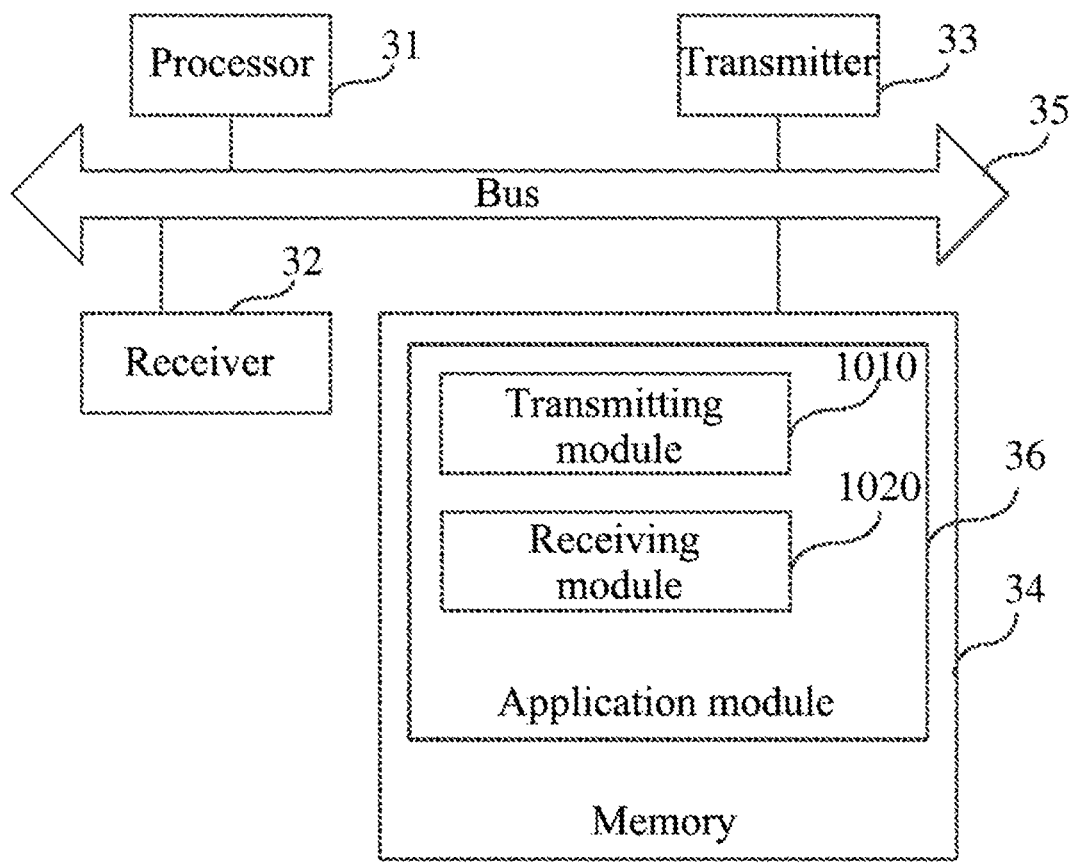
FIG. 13 is a schematic structural diagram of a first access network device according to an exemplary embodiment of the present disclosure.

Reference may be made to FIG. 13 which shows a schematic structural diagram of an access network device according to an exemplary embodiment of the present disclosure. The access network device may be the first access network device 120 in the implementation environment shown in FIG. 1. This embodiment is described by taking the access network device 120 being an eNB in an LTE system as an example. The access network device includes: a processor 31, a receiver 32, a transmitter 33, a memory 34, and a bus 35.

The processor 31 includes one or more processing cores, and executes various functional applications and information processing by running software programs and modules.

The receiver 32 and the transmitter 33 can be implemented as a communication component, where the communication component can be a communication chip which may include a receiving module, a transmitting module, a modem module, etc., for modulating and demodulating information, and receiving or transmitting the information via a radio signal.

The memory 34 is connected to the processor 31 via the bus 35.

The memory 34 can be used to store software programs as well as modules.

The memory 34 can store an application module 36 as described for at least one function. The application module 36 may include the transmitting module 1010 and the receiving module 1020.

The processor 31 is configured to: transmit first configuration information to a second access network device, where the first configuration information is used to indicate a resource in a target carrier, and the second access network device is configured to receive, in the resource, second uplink information transmitted by a terminal device; transmit, on a first carrier, first downlink information to the terminal device based on a first communication protocol; and receive, on the target carrier, the first uplink information transmitted by the terminal device.

Here, the second access network device is further configured to transmit, on a second carrier, second downlink information to the terminal device based on a second communication protocol, the first communication protocol being different from the second communication protocol.

The processor 31 is configured to execute the transmitting module 1010 to implement the functions of the transmitting step performed by the first access network device in each of the foregoing method embodiments; the processor 31 is configured to execute the receiving module 1020 to implement the functions of the receiving step performed by the first access network device in each of the foregoing method embodiments.

Moreover, the memory 34 can be implemented by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

Figure 14:
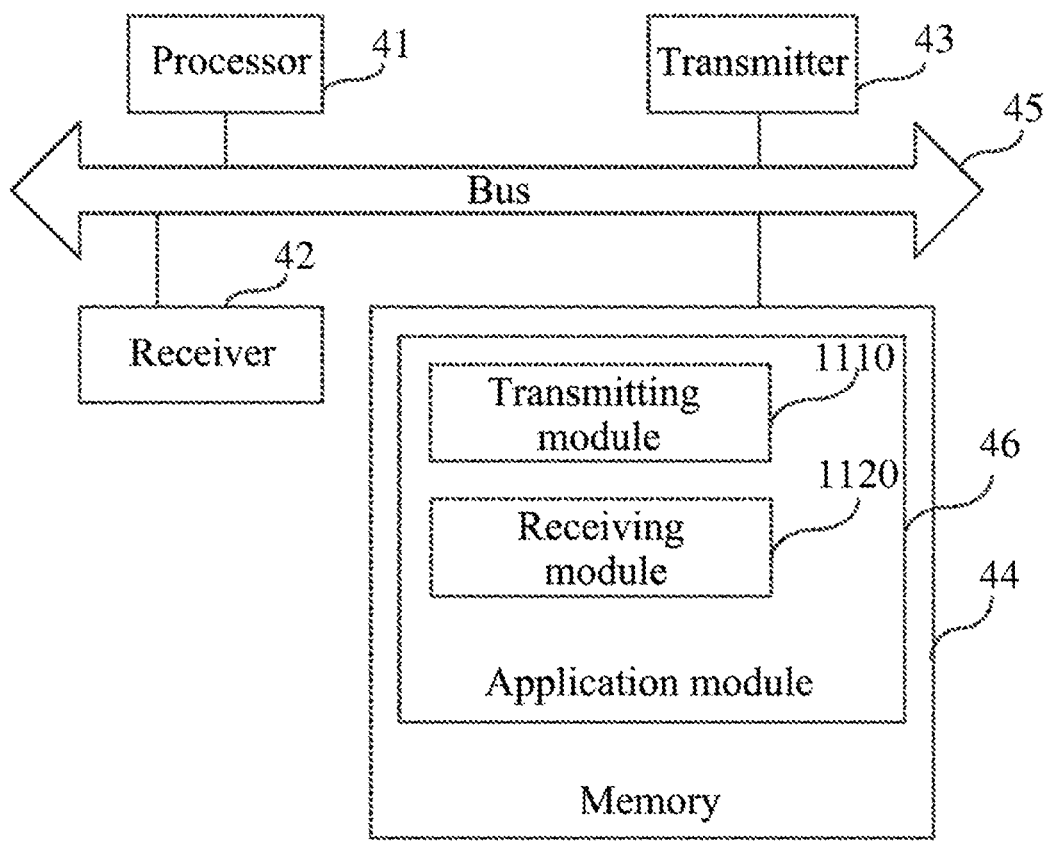
FIG. 14 is a schematic structural diagram of a second access network device according to an exemplary embodiment of the present disclosure.

Reference may be made to FIG. 14 which shows a schematic structural diagram of an access network device according to an exemplary embodiment of the present disclosure. The access network device may be the second access network device 140 in the implementation environment shown in FIG. 1. This embodiment is described by taking the access network device 120 being a gNB in a 5G system as an example. The access network device includes: a processor 41, a receiver 42, a transmitter 43, a memory 44, and a bus 45.

The processor 41 includes one or more processing cores, and executes various functional applications and information processing by running software programs and modules.

The receiver 42 and the transmitter 43 can be implemented as a communication component, where the communication component can be a communication chip which may include a receiving module, a transmitting module, a modem module, etc., for modulating and demodulating information, and receiving or transmitting the information via a radio signal.

The memory 44 is connected to the processor 41 via the bus 45.

The memory 44 can be used to store software programs as well as modules.

The memory 44 can store an application module 46 as described for at least one function. The application module 46 may include the transmitting module 1110 and the receiving module 1120.

The processor 41 is configured to transmit, on a second carrier, second downlink information to a terminal device based on a second communication protocol, and is further configured to receive, on a target carrier, second uplink information transmitted by the terminal device.

Here, the terminal device is configured to transmit, on the target carrier, first uplink information to a first access network device based on a first communication protocol, the first communication protocol being different from the second communication protocol.

The processor 41 is configured to execute the transmitting module 1010 to implement the functions of the transmitting step performed by the second access network device in each of the foregoing method embodiments; and the processor 41 is configured to execute the receiving module 1020 to implement the functions of the receiving step performed by the second access network device in each of the foregoing method embodiments.

Moreover, the memory 44 can be implemented by any type of volatile or non-volatile memory devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

Figure 15:
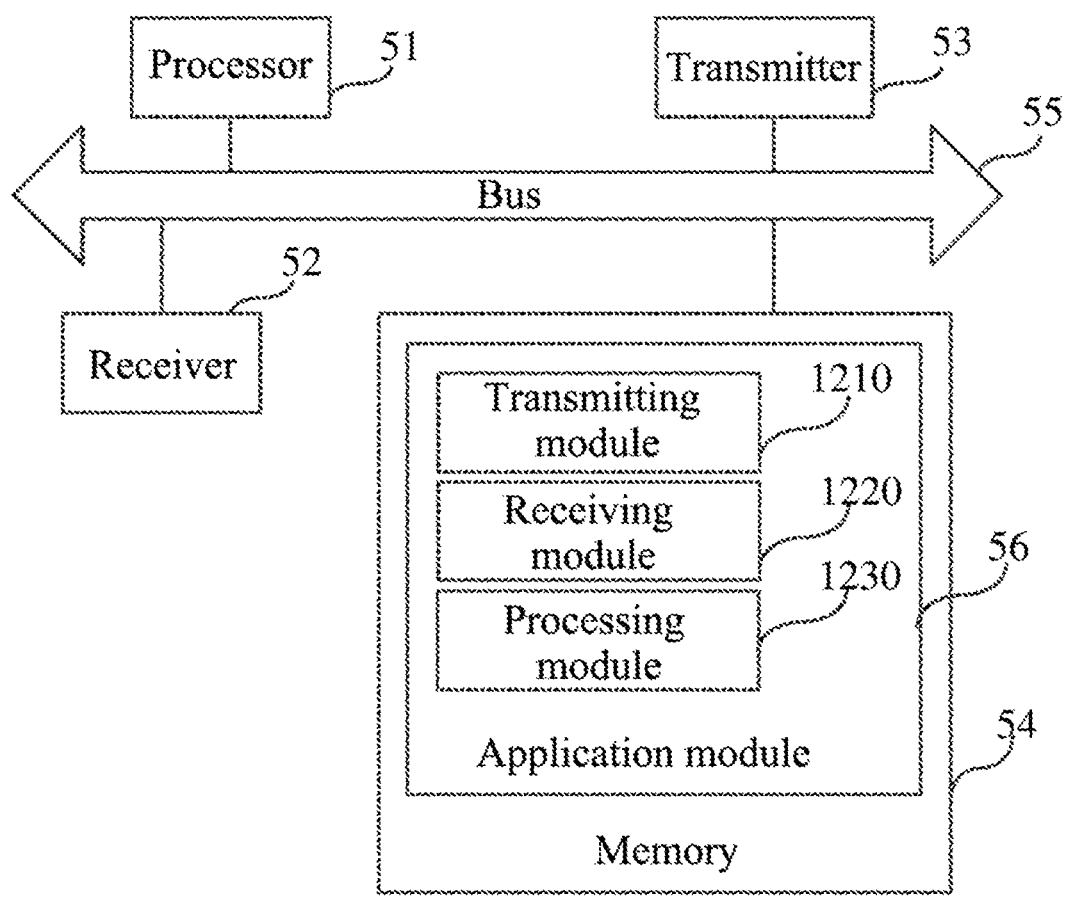
FIG. 15 is a schematic structural diagram of a terminal device according to an exemplary embodiment of the present disclosure.

Reference may be made to FIG. 15 which shows a schematic structural diagram of a terminal device according to an exemplary embodiment of the present disclosure. The terminal device may be the terminal device 140 in the mobile communication system shown in FIG. 1. This embodiment is described by taking the terminal device 140 being UE which operates in a dual connectivity scenario (including an LTE system and a 5G system) as an example. The terminal device includes: a processor 51, a receiver 52, a transmitter 53, a memory 54, and a bus 55.

The processor 51 includes one or more processing cores, and executes various functional applications and information processing by running software programs and modules.

The receiver 52 and the transmitter 53 can be implemented as a communication component, where the communication component can be a communication chip which may include a receiving module, a transmitting module, a modem module, etc., for modulating and/or demodulating information, and receiving or transmitting the information via a radio signal.

The memory 54 is connected to the processor 51 via the bus 55.

The memory 54 can be used to store software programs as well as modules.

The memory 54 can store an application module 56 as described for at least one function. The application module 56 may include the transmitting module 1210, the receiving module 1220, and the processing module 1230.

The processor 51 is configured to: receive, on a first carrier based on a first communication protocol, first downlink information transmitted by a first access network device; receive, on a second carrier based on a second communication protocol, second downlink information transmitted by a second access network device; and transmit on a target carrier, first uplink information to the first access network device based on the first communication protocol and second uplink information to the second access network device.

Here, the first communication protocol is different from the second communication protocol.

The processor 51 is configured to execute the transmitting module 1210 to implement the functions of the transmitting step performed by the terminal device in each of the foregoing method embodiments; the processor 51 is configured to execute the receiving module 1220 to implement the functions of the receiving step performed by the terminal device in each of the foregoing method embodiments; and the processor 51 is configured to execute the processing module 1230 to implement the functions of the processing step performed by the terminal device in each of the foregoing method embodiments.

Moreover, the memory 54 can be implemented by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

An embodiment of the present disclosure further provides a system for uplink information transmission, where the system for the uplink information transmission may include a first access network device, a second access network device, and a terminal device.

The first access network device may include the apparatus for the uplink information transmission provided in FIG. 10 described above, the second access network device may include the apparatus for the uplink information transmission provided in FIG. 11 described above, and the terminal device may include the apparatus for the uplink information transmission provided in FIG. 12 described above;

or, the first access network device may include the access network device provided in FIG. 13 described above, the second access network device may include the access network device provided in FIG. 14 described above, and the terminal device may include the terminal device provided in FIG. 15 described above.

Those skilled in the art should appreciate that in one or more of the above examples, the functions described in the embodiments of the present disclosure may be implemented in hardware, software, firmware, or any combination thereof. When implemented in software, the functions may be stored in a computer readable medium or transmitted as one or more instructions or codes on the computer readable medium. The computer readable medium includes a computer storage medium and a communication medium, where the communication medium includes any medium that facilitates transfer of a computer program from one location to another location. The storage medium may be any available medium that can be accessed by a general-purpose or special-purpose computer.

The above descriptions are only preferred embodiments of the present disclosure, but are not to limit the present disclosure. Any modifications, equivalent replacements, improvements, etc., which are within the spirit and scope of the present disclosure, should be included in the protection scope of the present disclosure.

What is claimed is:

1. A method for uplink information transmission, comprising:

receiving on a first carrier based on a first communication protocol, by a terminal device, first downlink information transmitted by a first access network device;

receiving on a second carrier based on a second communication protocol, by the terminal device, second downlink information transmitted by a second access network device; and transmitting on a target carrier, by the terminal device, first uplink information to the first access network device based on the first communication protocol and second uplink information to the second access network device;

wherein the first communication protocol is different from the second communication protocol;

wherein the method further comprises: receiving, by the terminal device, fifth configuration information transmitted by the first access network device and sixth configuration information transmitted by the second access network device, and determining a transmission parameter of the second uplink information according to the fifth configuration information and the sixth configuration information, wherein the fifth configuration information is used to indicate a first time-frequency resource, and the sixth configuration information is used to indicate a second time-frequency resource which is a subset of the first time-frequency resource;

wherein the transmitting on a target carrier, by the terminal device, first uplink information to the first access network device based on the first communication protocol and second uplink information to the second access network device comprises:

transmitting in a first resource in the target carrier, by the terminal device, the first uplink information to the first access network device based on the first communication protocol, and transmitting in a second resource in the target carrier, by the terminal device, the second uplink information to the second access network device, wherein the second resource in the target carrier is indicated to the second access network device through first configuration information transmitted from the first access network device; wherein the first configuration information is used to indicate the second resource in the target carrier in the following manners:

the first configuration information is used to indicate a first frequency-domain resource set in the target carrier, and the first frequency-domain resource set in each uplink slot or each uplink subframe in the target carrier is reserved for the second access network device; or the first configuration information is used to indicate a first time-domain resource set and a second frequency-domain resource set, and the second frequency-domain resource set in each time slot or each subframe comprised in the first time-domain resource set in the target carrier is reserved for the second access network device.

2. The method according to claim 1, wherein the first uplink information comprises at least one of:
feedback acknowledge information (ACK/NACK) corresponding to the first downlink information;
a channel quality indicator (CQI) of the first carrier;
a scheduling request (SR); and
uplink traffic data.

3. The method according to claim 1, wherein the second uplink information comprises at least one of:
feedback acknowledge information (ACK/NACK) corresponding to the second downlink information; and
a channel quality indicator (CQI) of the second carrier.

4. The method according to claim 1, further comprising:
receiving, by the terminal device, second configuration information transmitted by the first access network device, wherein the second configuration information is used to indicate a transmission parameter of the first uplink information.

5. The method according to claim 1, wherein the transmitting on the target carrier, by the terminal device, the first uplink information to the first access network device based on the first communication protocol and the second uplink information to the second access network device comprises:
transmitting on the target carrier, by the terminal device, the first uplink information using a first uplink channel and the second uplink information using a second uplink channel;
wherein the first uplink channel is different from the second uplink channel.

6. A terminal device, comprising: a processor, a receiver, and a transmitter, wherein
the processor is configured to receive, through the receiver on a first carrier based on a first communication protocol, first downlink information transmitted by a first access network device;
the processor is further configured to receive, through the receiver on a second carrier based on a second communication protocol, second downlink information transmitted by a second access network device; and
the processor is further configured to transmit, through the transmitter, on a target carrier, first uplink information to the first access network device based on the first communication protocol and second uplink information to the second access network device;
wherein the first communication protocol is different from the second communication protocol;

the processor is further configured to: receive, through the receiver, fifth configuration information transmitted by the first access network device and sixth configuration information transmitted by the second access network device; and determine a transmission parameter of the second uplink information according to the fifth configuration information and the sixth configuration information; wherein the fifth configuration information is used to indicate a first time-frequency resource, and the sixth configuration information is used to indicate a second time-frequency resource which is a subset of the first time-frequency resource;

wherein the processor is further configured to transmit, through the transmitter in a first resource in the target carrier, the first uplink information to the first access network device based on the first communication protocol, and transmit, through the transmitter in a second resource in the target carrier, the second uplink information to the second access network device, wherein the second resource in the target carrier is indicated to the second access network device through first configuration information transmitted from the first access network device; wherein the first configuration information is used to indicate the second resource in the target carrier in the following manners:

the first configuration information is used to indicate a first frequency-domain resource set in the target carrier, and the first frequency-domain resource set in each uplink slot or each uplink subframe in the target carrier is reserved for the second access network device; or the first configuration information is used to indicate a first time-domain resource set and a second frequency-domain resource set, and the second frequency-domain resource set in each time slot or each subframe comprised in the first time-domain resource set in the target carrier is reserved for the second access network device.

7. The terminal device according to claim 6,
wherein the target carrier is a carrier as same as the first carrier when the first carrier is a time division duplexing (TDD) carrier; or
the target carrier is an uplink carrier paired with the first carrier when the first carrier is a frequency division duplexing (FDD) downlink carrier.

8. The terminal device according to claim 6, wherein the first uplink information comprises at least one of:
feedback acknowledge information (ACK/NACK) corresponding to the first downlink information;
a channel quality indicator (CQI) of the first carrier;
a scheduling request (SR);
uplink traffic data.

9. The terminal device according to claim 6, wherein the second uplink information comprises at least one of:
feedback acknowledge information (ACK/NACK) corresponding to the second downlink information; and
a channel quality indicator (CQI) of the second carrier.

10. The terminal device according to claim 6, wherein the processor is further configured to receive, through the receiver, second configuration information transmitted by the first access network device, wherein the second configuration information is used to indicate a transmission parameter of the first uplink information.

11. The terminal device according to claim 10, wherein the transmission parameter of the first uplink information comprises first channel resource indication information which is used to indicate a time-domain resource location and/or a frequency-domain resource location of a physical channel that is configured to transmit on the target carrier the first uplink information.

12. The terminal device according to claim 6, wherein the transmission parameter of the second uplink information comprises second channel resource indication information which is used to indicate a time-domain resource location and/or a frequency-domain resource location of a physical channel that is configured to transmit on the target carrier the second uplink information.

13. The terminal device according to claim 6, wherein the processor is further configured to transmit, through the transmitter on the target carrier, the first uplink information using a first uplink channel and the second uplink information using a second uplink channel; wherein the first uplink channel is different from the second uplink channel.

14. The terminal device according to claim 13, wherein the first uplink channel is an uplink channel based on the first communication protocol.

15. The terminal device according to claim 13, wherein the second uplink channel is an uplink channel based on the first communication protocol or the second communication protocol.

16. The terminal device according to claim 13, wherein the second uplink channel is a physical uplink control channel.

17. The terminal device according to claim 6, wherein the first communication protocol comprises a long term evolution (LTE) protocol, and the second communication protocol comprises a new radio (NR) protocol.

* * * * *